(12) United States Patent
Li et al.

(10) Patent No.: US 12,097,686 B1
(45) Date of Patent: Sep. 24, 2024

(54) HIGH BARRIER RECYCLABLE LAMINATED FILM AND PREPARATION METHOD THEREOF

(71) Applicants: DAWN ZHOUSHI (QINGDAO) MULTI-LAYER PACKAGING MATERIAL CO., LTD., Shandong (CN); QINGDAO BIOBORN PACKAGING CO., LTD., Shandong (CN)

(72) Inventors: Shuangli Li, Shandong (CN); Suocheng Yang, Shandong (CN); Rui Zhou, Shandong (CN); Shun Gao, Shandong (CN); Tao Wang, Shandong (CN); Jianhao Li, Shandong (CN)

(73) Assignees: DAWN ZHOUSHI (QINGDAO) MULTI-LAYER PACKAGING MATERIAL CO., LTD., Shandong (CN); QINGDAO BIOBORN PACKAGING CO., LTD., Shandong (CN)

( * ) Notice: Subject to any disclaimer, the term of this patent is extended or adjusted under 35 U.S.C. 154(b) by 0 days.

(21) Appl. No.: 18/615,248

(22) Filed: Mar. 25, 2024

(30) Foreign Application Priority Data

Mar. 12, 2024 (CN) .......................... 202410281918.1

(51) Int. Cl.
| | |
|---|---|
| B32B 27/08 | (2006.01) |
| B32B 7/02 | (2019.01) |
| B32B 7/12 | (2006.01) |
| B32B 27/16 | (2006.01) |
| B32B 27/18 | (2006.01) |
| B32B 27/32 | (2006.01) |
| B32B 37/06 | (2006.01) |
| B32B 37/10 | (2006.01) |
| B32B 37/12 | (2006.01) |
| B32B 37/24 | (2006.01) |
| B32B 38/00 | (2006.01) |
| C08J 5/12 | (2006.01) |
| C08J 7/04 | (2020.01) |
| C08J 7/043 | (2020.01) |
| C08J 7/048 | (2020.01) |
| C08J 7/12 | (2006.01) |

(52) U.S. Cl.
CPC ............... *B32B 27/08* (2013.01); *B32B 7/02* (2013.01); *B32B 7/12* (2013.01); *B32B 27/16* (2013.01); *B32B 27/18* (2013.01); *B32B 27/32* (2013.01); *B32B 37/06* (2013.01); *B32B 37/10* (2013.01); *B32B 37/1207* (2013.01); *B32B 37/1284* (2013.01); *B32B 37/24* (2013.01); *B32B 38/0008* (2013.01); *C08J 5/127* (2013.01); *C08J 7/042* (2013.01); *C08J 7/043* (2020.01); *C08J 7/048* (2020.01); *C08J 7/123* (2013.01); *B32B 2037/1215* (2013.01); *B32B 2037/243* (2013.01); *B32B 2250/02* (2013.01); *B32B 2250/242* (2013.01); *B32B 2255/10* (2013.01); *B32B 2255/26* (2013.01); *B32B 2255/28* (2013.01); *B32B 2270/00* (2013.01); *B32B 2307/414* (2013.01); *B32B 2307/54* (2013.01); *B32B 2307/718* (2013.01); *B32B 2307/7244* (2013.01); *B32B 2307/7246* (2013.01); *B32B 2307/7376* (2023.05); *B32B 2307/748* (2013.01); *B32B 2309/02* (2013.01); *B32B 2310/14* (2013.01); *B32B 2553/00* (2013.01); *C08J 2323/06* (2013.01); *C08J 2323/12* (2013.01); *C08J 2423/08* (2013.01); *C08J 2429/04* (2013.01); *C08J 2475/04* (2013.01)

(58) Field of Classification Search
CPC ....... B32B 27/32; B32B 27/327; C08L 69/00; C08L 69/005
See application file for complete search history.

(56) References Cited

U.S. PATENT DOCUMENTS

2006/0272767 A1* 12/2006 Kreitman ................ B32B 27/08
156/244.11

* cited by examiner

*Primary Examiner* — Zachary M Davis
(74) *Attorney, Agent, or Firm* — Cooper Legal Group, LLC

(57) ABSTRACT

The present application discloses a high-barrier polyolefin composite film, including, from the outside to the inside, an outer PE film, a water-barrier layer, a high-barrier PVA coating layer, an adhesive layer, and an inner PE film, wherein the inner PE film comprises the following raw materials in percentage by weight: 10-20% of HDPE, 30-50% of MDPE, 20-26% of LLDPE, 10-20% of LDPE, 8-12% of a water- and oxygen-barrier masterbatch, and 1-3% of an auxiliary agent; the water- and oxygen-barrier masterbatch includes the following raw materials in parts by weight: 10-20 parts of polycarbonate, 0.1-0.3 parts of a compatibilizer, 10-20 parts of an ethylene-vinyl acetate copolymer (EVA), 1-2 parts of single-layer graphene, and 1-2 parts of polyhedral oligomeric silsesquioxane.

10 Claims, No Drawings

HIGH BARRIER RECYCLABLE LAMINATED FILM AND PREPARATION METHOD THEREOF

CROSS-REFERENCE TO RELATED APPLICATION

This application claims the priority and benefit of China patent application no. 202410281918.1, filed on Mar. 12, 2024. The entirety of China patent application no. 202410281918.1 is hereby incorporated by reference herein and made a part of this specification.

TECHNICAL FIELD

The present application relates to the technical field of packaging films and, more particularly, to a high-barrier polyolefin composite film and a preparation method thereof.

BACKGROUND ART

At present, common high-barrier composite films are mainly prepared by combining BOPET12 with AL9, and then combining PE50 on an aluminum foil surface to obtain a composite packaging film with a thickness of about 73 μm. Because of the metal aluminum foil, the composite packaging film has high barrier properties (against oxygen and water). However, due to the non-transparency of the aluminum foil, this type of packaging is "eclipsed" because it cannot exhibit the appearance of a packaged product. In addition, as the global plastic pollution is getting worse, a large amount of adhesives are used to tightly bond multiple layers of films of different materials, and it is extremely difficult to peel off and sort the multiple layers of films and remove the adhesives. As a result, composite films made of multiple materials cannot be recycled, exacerbating global white pollution.

In order to address the problem caused by the non-transparency of high-barrier packaging, the industry has successively introduced various barrier films, such as: EVOH high-barrier co-extruded films, silicon oxide, and alumina films. However, such films are very expensive, which hinders the replacement and commercial processes of these films and affects their secondary recycling and reuse.

PE and PP are the most widely used polymer materials in the world today. PE is a polymer material with simple structure, low cost and good mechanical properties. PP has a linear structure, similar to PE, except that on a main chain, there is a methyl side group every other carbon atom, so the entire molecule has three different isomers in terms of spatial structure. Both PE and PP can be formed by means of blending, injection, extrusion, blow molding and the like. PE film is a transparent and soft film, and PE film is a highly transparent film having high rigid, both of which are easy to recycle and reuse. With good chemical stability, temperature resistance and heat sealability, they are mainly used for surface protection of various products with high surface condition requirements. With low price, they are also often used for food packaging. However, PE and PP are low-barrier materials with poor barrier properties against water vapor and oxygen. So they cannot prevent the permeability of oxygen from the external environment and also cannot prevent the evaporation of internal water vapor.

SUMMARY

In order to improve the barrier properties of the single-material PP or PE film, the present application provides a high-barrier polyolefin composite film and a preparation method thereof.

In a first aspect, the present application provides a high-barrier polyolefin composite film, which adopts the following technical solution:

A high-barrier polyolefin composite film includes, from the outside to the inside, an outer film, a water-barrier layer, a high-barrier PVA coating layer, an adhesive layer, and an inner film, wherein, when the outer film is an outer PP film, the inner film is an inner PP film, and when the outer film is an outer PE film, the inner film is a modified inner PE film;

the modified inner PE film includes the following raw materials in percentage by weight: 10-20% of HDPE, 30-50% of MDPE, 20-26% of LLDPE, 10-20% of LDPE, 8-12% of a water- and oxygen-barrier masterbatch, and 1-3% of an auxiliary agent;

the water- and oxygen-barrier masterbatch includes the following raw materials in parts by weight: 10-20 parts of polycarbonate, 0.1-0.3 parts of a compatibilizer, 10-20 parts of an ethylene-vinyl acetate copolymer (EVA), 1-2 parts of single-layer graphene, and 1-2 parts of polyhedral oligomeric silsesquioxane.

According to the above technical solution, due to use of the single-material outer PE film and the modified inner PE film which are bonded and combined or use of the single-material outer PP film and the single-material inner PP film which are bonded and combined, the composite film is easy to recycle. Low-density polyethylene, high-density polyethylene, linear low-density polyethylene, and the like are used in raw materials of the modified inner PE film. The linear low-density polyethylene and the low-density polyoxyethylene have high strength, good toughness, high stiffness, good heat and cold resistance, good environmental stress cracking resistance, and excellent impact strength and tear resistance. Although the environmental stress cracking resistance of the high-density polyethylene is not as good as that of the low-density polyethylene, the high-density polyethylene has low permeability to water vapor and air and low water absorption, thus achieving good barrier properties. The water- and oxygen-barrier masterbatch contains polycarbonate, EVA, single-layer graphene and other components. When used for preparing the modified inner PE film, the water- and oxygen-barrier masterbatch is blended with the low-density polyethylene and other raw materials. The EVA can improve the flexibility and environmental stress cracking resistance of the PE material, and can also improve the permanent deformation of the modified inner PE film, enhance the tear strength, and reduce the sensitivity of the modified inner PE film to gaps. When the polycarbonate is mixed with the low-density polyethylene, the high-density polyethylene, and the like, under the action of the compatibilizer, a transesterification reaction can occur, so that the polycarbonate is uniformly dispersed in the modified inner PE film. The EVA, as an ethylene copolymer, has good compatibility with HDPE, and side groups are functional groups that can react macromolecularly with the polycarbonate. During the blending, extrusion and film blowing process, the polycarbonate and the EVA undergo a transesterification reaction in a molten state to form a connected or cross-linked copolymer at an interface, thereby improving the compatibility of a polycarbonate-HDPE blending system and enhancing the dispersion of the water- and oxygen-barrier masterbatch in the modified inner PE film. Single-layer graphene sheets are easily agglomerated, so by virtue of steric hindrance produced by the polyhedral oligomeric silsesquioxane absorbed on the surface of single-layer graphene, the single-layer graphene is dispersed more uniformly and stably. The single-layer graphene sheets are uniformly dispersed in the modified inner PE film, thereby blocking the permeability of water vapor and oxygen and improving barrier properties. The single-layer graphene has high transparency and biocompatibility. With a light transmittance of 97% or above, the single-layer graphene is almost completely transparent to the naked eye. Moreover, the addition of the polycarbonate and the EVA can also further improve the tear resistance and puncture resistance of the modified inner PE film. In addition, since the polycarbonate and the EVA in the water- and oxygen-barrier masterbatch are both thermoplastic materials, during the recycling of the polyolefin composite film, such as during injection molding, the raw materials in the water- and oxygen-barrier masterbatch can be hot-melted and will not affect the recycling and injection molding of the polyolefin composite film.

Optionally, the water- and oxygen-barrier masterbatch is prepared as follows:

hot-melting the EVA, adding the polyhedral oligomeric silsesquioxane and the single-layer graphene purified with concentrated nitric acid, dispersing the materials ultrasonically for 1-2 h, and drying the mixture to constant weight at 50-60° C. to obtain modified single-layer graphene; and mixing the modified single-layer graphene with the polycarbonate and the compatibilizer and then performing melting, extruding and granulating, and drying.

According to the above technical solution, the purified single-layer graphene has high purity and does not contain carbon impurities such as amorphous carbon, and the purification process does not destroy the one-dimensional structure of the single-layer graphene. Moreover, many carboxyl and hydroxyl functional groups are generated on the surface of the single-layer graphene purified with nitric acid, which can improve the activity of the single-layer graphene. In addition, a strong interaction between the carboxyl functional groups on the single-layer graphene and EVA molecules can fix the single-layer graphene on the surface of EVA, which facilitates the uniform dispersion of the single-layer graphene in the EVA. The EVA and the PC have good compatibility with no obvious interface. The high content of single-layer graphene is uniformly dispersed in the EVA. By means of melting, the modified single-layer graphene can be uniformly diluted in the polycarbonate. The presence of EVA also greatly improves the interfacial strength of PC and PE and increases their interfacial interaction and interfacial friction, which is conducive to load transfer, thereby improving the tensile strength, elastic modulus, elongation at break, toughness, and other mechanical properties of the water- and oxygen-barrier masterbatch.

Optionally, the compatibilizer includes maleic anhydride-grafted LDPE and maleic anhydride-grafted ethylene-vinyl acetate at a mass ratio of 1:0.3-0.5.

According to the above technical solution, the main chain in the maleic anhydride-grafted LDPE is compatible with the low-density polyethylene in the modified inner PE film. During the melting and extruding process for preparing the modified inner PE film, maleic anhydride groups react in situ with carboxyl and hydroxyl end groups in the polycarbonate at a high temperature, resulting in chain entanglement between the components, enhancing the intermolecular force, increasing the contact area between the two phases, and significantly improving the compatibility of the low-density polyethylene and the linear low-density polyethylene with the polycarbonate. The maleic anhydride-grafted ethylene-vinyl acetate is a graft or cross-linked copolymer of polycarbonate and EVA, which can improve the compatibility of the polycarbonate with the high-density polyethylene. In addition, the maleic anhydride-grafted ethylene-vinyl acetate, with excellent viscosity, can increase the tightness between the components in the modified inner PE film, and can further improve the barrier properties of the composite film.

Optionally, the preparation of a high-barrier PVA coating solution includes the following steps:

dissolving a carboxylated cellulose nanofiber to prepare a solution with a concentration of 0.8-1 wt %, adding chitosan, performing ultrasonic dispersion, and then freeze-drying and pulverizing the mixture to obtain an airgel powder;

dissolving tannic acid to prepare a tannic acid solution with a concentration of 2-4 wt %, immersing the airgel powder in the tannic acid solution for 5-10 min, and performing washing to obtain a modified airgel powder; and dissolving polyvinyl alcohol to prepare an aqueous solution of polyvinyl alcohol with a concentration of 5-7 wt %, adding the modified airgel powder and octadecyltrichlorosilane, and mixing the solution adequately to obtain the high-barrier PVA coating solution.

According to the above technical solution, the chitosan is a natural cationic polysaccharide with good film-forming properties, biodegradability, and antioxidant and antibacterial activity. The carboxylated cellulose nanofiber is a typical nanocellulose material, in which nanocellulose chains can be entangled with each other, making the carboxylated cellulose nanofiber a carrier that is abundant in carboxyl groups and has high crystallinity, large specific surface area, high transparency, and excellent mechanical properties. Moreover, its own abundant hydroxyl groups promote the attraction of water molecules around it. Since carboxyl and amino groups contained in the chitosan undergo a cross-linking reaction with the carboxylated cellulose nanofiber to form amide bonds, the chitosan and the carboxylated cellulose nanofiber can form a network structure with good elasticity, high mechanical strength, good hydrophobicity and strong adsorption. The airgel powder is immersed in the tannic acid solution so that the tannic acid remains in pores of the airgel powder. The airgel powder is then soaked in the polyvinyl alcohol solution, and the polyvinyl alcohol and the tannic acid are complexed by virtue of hydrogen bonds. A large number of hydrogen bonds can produce stable adhesion during the formation process, and due to high polarization strength, a supramolecular adhesive is formed, thereby improving the adhesion of the high-barrier PVA coating layer to the outer film and the PE inner film. The last added octadecyltrichlorosilane is an alkyl silane and a low-surface-energy material that can self-assemble on a variety of base materials. After the high-barrier PVA coating solution forms a coating layer, the octadecyltrichlorosilane can make the coating layer have ultra-low surface energy, thus achieving good hydrophobic and water-barrier effects. In addition, the octadecyltrichlorosilane can form hydrogen bonds with the hydroxyl groups in the polyvinyl alcohol, thereby improving its uniformity and stability on the surface of the coating layer.

Optionally, the high-barrier PVA coating layer is formed from the high-barrier PVA coating solution, and the high-barrier PVA coating solution includes the following raw materials in parts by weight: 1.5-2.2 parts of polyvinyl alcohol, 1-1.2 parts of carboxylated cellulose nanofiber, 0.8-1.2 parts of chitosan, 0.4-0.6 parts of tannic acid, and 1-1.5 parts of octadecyltrichlorosilane.

According to the above technical solution, the use amounts of the raw materials described above are enough so that the high-barrier PVA coating solution can form a coating layer with good density, low surface energy, strong hydrophobicity and water barrier ability on the water-barrier layer.

Optionally, the water-barrier layer is formed by hot-melting and curing a water-barrier adhesive; the water-barrier adhesive is prepared as follows:

by weight, adequately mixing 1-2 parts of polydimethylsiloxane, 10-20 parts of n-hexane and 0.1-0.2 parts of a polydimethylsiloxane (PDMS) curing agent together, adding 0.5-1 part of hydrophobic nano-silica, and mixing the mixture adequately; drying the mixture at 80-90° C. for 1-2 h, and ultrafinely pulverizing the mixture to obtain an intermediate; and then mixing the intermediate with 4-8 parts of EVA resin adequately to obtain the water-barrier adhesive.

According to the above technical solution, the PDMS is a flexible polymer material with excellent chemical stability and high flexibility. Due to its weak intermolecular force, the PDMS has low surface energy and superhydrophobic function. Silica is hydrophilic because it contains a large number of hydrophilic hydroxyl groups on its surface. Silica is hydrophobically modified by attaching hydrophobic groups to its surface so that the silica can be more uniformly dispersed in the PDMS. The PDMS, as an adhesive, is cured on the surface of hydrophobic nano-silica to make the silica exhibit super-hydrophobic properties. The silica is then ultrafinely pulverized and mixed with EVA resin. The EVA resin has good adhesion to many compounds, so it can increase the bonding fastness between hydrophobic nano-silica particles and the outer film. And the hydrophobic silica gives the outer film a rough surface, thereby further improving the adhesion between the high-barrier PVA coating layer and the outer film. Moreover, due to its high transparency, softness and flexibility, low surface energy, and strong adhesion to the non-polar outer film, the EVA resin can improve the barrier properties of the outer film and also can improve the adhesion fastness of the high-barrier PVA coating layer. In the meanwhile, due to its good compatibility with PE and PP materials, the EVA does not affect, during the recycling of the polyolefin composite film, the properties of products using the recycled polyolefin composite film.

Optionally, the adhesive layer is formed by curing an adhesive, and the adhesive is one of a polyurethane adhesive, an epoxy resin adhesive, and an acrylic resin adhesive.

According to the above technical solution, the polyurethane adhesive and other materials have long-lasting adhesion, which can make the outer film and the inner film adhere tightly, thus forming a composite film with high adhesion strength.

Optionally, a thickness ratio of the outer PE film to the modified inner PE film is 1-1.5:1.

According to the above technical solution, the above thickness ratio can better maintain the transparency of the PE composite film while maintaining its barrier properties.

In a second aspect, the present application provides a preparation method of a high-barrier polyolefin composite film, adopting the following technical solution:

A preparation method of the high-barrier polyolefin composite film, including the following steps:

performing corona treatment on an inner side of the outer film, heating the water-barrier adhesive to 50-55° C., applying the heated water-barrier adhesive onto the corona-treated side of the outer film, and drying the water-barrier adhesive to form the water-barrier layer on the outer film;

applying the high-barrier PVA coating solution onto a surface of the water-barrier layer and drying the high-barrier PVA coating solution to form the high-barrier PVA coating layer on the water-barrier layer; and applying a layer of the adhesive onto the high-barrier PVA coating layer by using a brush roller with a temperature of 35-50° C., and combining the inner film on the adhesive by using a hot-press roller with a temperature of 35-50° C.; and cooling, drawing, winding up, and aging the combined film to obtain the high-barrier polyolefin composite film.

According to the above technical solution, after the outer film is coated, the water-barrier layer and the high-barrier PVA coating layer are formed, which can enhance the barrier properties of the outer film against water vapor and oxygen, thus further improving the barrier properties of the polyolefin composite film. The outer film and the inner film are combined by the adhesive and the combination method is simple, which is easy for industrial production.

Optionally, the application amount of the water-barrier adhesive is 1-3 $g/m^2$, the application amount of the high-barrier PVA coating solution is 2-6 $g/m^2$, and the application amount of the adhesive is 1.2-4 $g/m^2$.

According to the above technical solution, the water-barrier adhesive forms a water-barrier layer of an appropriate thickness on the corona-treated side of the outer film, which can achieve good water vapor barrier properties without affecting the transparency of the composite film. Moreover, the water-barrier adhesive has good wettability with the outer film and can increase the adhesion strength between the high-barrier PVA coating layer and the outer film.

In summary, the present application has the following beneficial effects.

1. According to the present application, since the linear low-density polyethylene, the low-density polyethylene, the high-density polyethylene, and the like are used to prepare the modified inner PE film, the modified inner PE film and the outer PE film are combined together so that the prepared polyolefin composite film has strong environmental stress cracking resistance and impact resistance without affecting secondary recycling. The water- and oxygen-barrier masterbatch containing polycarbonate, EVA, single-layer graphene and polyhedral oligomeric silsesquioxane is also added. The EVA has good compatibility with the polycarbonate, and the polyhedral oligomeric silsesquioxane can enhance the dispersion of the single-layer graphene in the polycarbonate and the EVA, thereby forming a barrier channel in the modified inner PE film and improving the barrier properties of the polyolefin composite film. In addition, the EVA, the single-layer graphene and the polycarbonate have high transparency, so they do not affect the transparency of the polyolefin composite film. Moreover, a single-material polypropylene composite film may also be prepared by using the outer PP film, the water-barrier layer, the high-barrier PVA coating layer, the adhesive layer and the inner PP film, which does not affect recycling and further improves the barrier capability of the PP composite film.

2. In the present application, it is preferred to use the chitosan and the carboxylated cellulose nanofiber to prepare the airgel powder with a network structure by cross-linking, freeze-drying, and pulverizing, and then the airgel powder is immersed in the tannic acid solution, and finally added to the polyvinyl alcohol solution and the octadecyltrichlorosilane to obtain the high-barrier PVA coating solution. The hydrogen bond complex is formed between tannic acid and polyvinyl alcohol to form a supramolecular adhesive with high polarization strength, which can increase the adhesion strength between the high-barrier PVA coating layer and the water-barrier layer and also improve the water-barrier effect of the high-barrier PVA coating layer. In addition, the carboxylated cellulose nanofiber, the chitosan, and the like have good transparency, which does not affect the transparency of the polyolefin composite film.

In the present application, the hydrophobic nano-silica and the polydimethylsiloxane are mixed and pulverized, and then mixed with the EVA resin to form the water-barrier adhesive. After being heated and melted, the water-barrier adhesive flows to form the water-barrier layer with good density and high adhesion on the outer film. The EVA resin and the polydimethylsiloxane that have high transparency, low surface tension, and good waterproofness improves the barrier ability against water vapor without affecting the transparency of the polyolefin composite film and also without affecting the recycling of the polyolefin composite film.

DETAILED DESCRIPTION

The present application will be further described in detail below with reference to embodiments.

Preparation Examples 1-7 of Water- and Oxygen-Barrier Masterbatch

In Preparation Example 1, EVA used was US DuPont EVA 40W, with a melt index of 52 g/10 min (190° C., 2.16 kg), a density of 0.965 g/cm$^3$ and VA content of 40%, purchased from Kuraray Co., Ltd. (Japan); octaisobutyl polysesquioxane (product number: 9502019) used was purchased from Forsman Technology (Beijing) Co., Ltd.; single-layer graphene (model: TGF-I) used was purchased from Everoot (Xiamen) Graphene Technology Co., Ltd.; polypropylene carbonate (model: PPC-001) used was purchased from Wuhan Lullaby Pharmaceutical Chemical Co., Ltd.; maleic anhydride-grafted LDPE (model: E528) was purchased from Shanghai Xinkaili Plastic Technology Co., Ltd.; maleic anhydride-grafted ethylene-vinyl acetate (model: SH-112A) used was purchased from Dongguan Zhangmutou Hengtai Plastic Raw Materials Co., Ltd.; and maleic anhydride grafted POE (model: EB-3008) was purchased from Guangzhou Chuanju Chemical Technology Co., Ltd.

Preparation Example 1: 20 g of EVA was heated to 80° C., stirred and melted, 2 g of polyhedral oligomeric silsesquioxane and 2 g of single-layer graphene purified with concentrated nitric acid were added to the melted EVA and dispersed ultrasonically for 2 h, and the mixture was then dry to constant weight at 60° C. to obtain modified single-layer graphene. The polyhedral oligomeric silsesquioxane used was octaisobutyl polysesquioxane. The single-layer graphene was purified with concentrated nitric acid as follows: the single-layer graphene was mixed with 3 mol/L concentrated nitric acid, dispersed ultrasonically in a 80° C. water bath with stirring for 8 h, and then cooled to room temperature, filtered with suction, and washed with deionized water until the pH value of the filtrate was centered, and finally dried at 120° C.

The modified single-layer graphene was mixed with 20 g of polycarbonate and 0.3 g of a compatibilizer, and the mixture was then melted, extruded and granulated, and dried. The compatibilizer included maleic anhydride-grafted LDPE and maleic anhydride-grafted ethylene-vinyl acetate at a mass ratio of 1:0.5, and the polycarbonate was polypropylene carbonate made by the copolymerization of carbon dioxide and propylene oxide.

Preparation Example 2: 10 g of EVA was heated to 80° C., stirred and melted, 1 g of polyhedral oligomeric silsesquioxane and 1 g of single-layer graphene purified with concentrated nitric acid were added to the melted EVA and dispersed ultrasonically for 1 h, and the mixture was then dry to constant weight at 50° C. to obtain modified single-layer graphene. The polyhedral oligomeric silsesquioxane used was octaisobutyl polysesquioxane. The single-layer graphene was purified with concentrated nitric acid as follows: the single-layer graphene was mixed with 3 mol/L concentrated nitric acid, dispersed ultrasonically in a 80° C. water bath with stirring for 8 h, and then cooled to room temperature, filtered with suction, and washed with deionized water until the pH value of the filtrate was centered, and finally dried at 120° C.

The modified single-layer graphene was mixed with 10 g of polycarbonate and 0.1 g of a compatibilizer, and the mixture was then melted, extruded and granulated, and dried. The compatibilizer included maleic anhydride-grafted LDPE and maleic anhydride-grafted ethylene-vinyl acetate at a mass ratio of 1:0.3, and the polycarbonate was polypropylene carbonate made by the copolymerization of carbon dioxide and propylene oxide.

Preparation Example 3: The compatibilizer used in this preparation example was maleic anhydride-grafted LDPE, which is different from Preparation Example 1.

Preparation Example 4: The compatibilizer used in this preparation example was maleic anhydride-grafted POE, which is different from Preparation Example 1.

Preparation Example 5: No EVA was added in this preparation example, which is different Preparation Example 1.

Preparation Example 6: No single-layer graphene was added in this preparation example, which is different Preparation Example 1.

Preparation Example 7: No polyhedral oligomeric silsesquioxane was added in this preparation example, which is different Preparation Example 1.

Preparation Examples 8-12 of High-Barrier PVA Coating Solution

In Preparation Example 8, carboxylated cellulose nanofiber used was purchased from Macklin, with a diameter of 50 nm and a length of 1 μm, and chitosan used was purchased from Macklin, with a deacetylation degree of ≥95%.

Preparation Example 8: 1.2 g of a carboxylated cellulose nanofiber was dissolved in water to prepare an aqueous solution with a concentration of 1 wt %, 1.2 g of chitosan was added and dispersed ultrasonically at a power of 200 W for 20 min, and the mixture was then freeze-dried at −60° C. for 24 h and pulverized to obtain an airgel powder.

0.4 g of tannic acid was dissolved in distilled water to prepare a tannic acid solution with a concentration of 4 wt %, and the airgel powder prepared was immersed in the tannic acid solution for 10 min and then washed with deionized water to obtain a modified airgel powder.

2.2 g of polyvinyl alcohol 1788 was dissolved in distilled water to prepare an aqueous solution of polyvinyl alcohol with a concentration of 7 wt %, the modified airgel powder prepared and 1.5 g of octadecyltrichlorosilane were added, and the resulting solution was mixed adequately to obtain a high-barrier PVA coating solution.

Preparation Example 9: 1.0 g of a carboxylated cellulose nanofiber was dissolved in water to prepare an aqueous solution with a concentration of 0.8 wt %, 0.8 g of chitosan was added and dispersed ultrasonically at a power of 200 W for 20 min, and the mixture was then freeze-dried at −60° C. for 24 h and pulverized to obtain an airgel powder.

0.6 g of tannic acid was dissolved in distilled water to prepare a tannic acid solution with a concentration of 2 wt %, and the airgel powder prepared was immersed in the tannic acid solution for 5 min and then washed with deionized water to obtain a modified airgel powder.

1.5 g of polyvinyl alcohol 1788 was dissolved in distilled water to prepare an aqueous solution of polyvinyl alcohol with a concentration of 5 wt %, the modified airgel powder prepared and 1.0 g of octadecyltrichlorosilane were added and the resulting solution was mixed adequately to obtain a high-barrier PVA coating solution.

Preparation Example 10: No chitosan was added in this preparation example, which is different Preparation Example 8.

Preparation Example 11: No octadecyltrichlorosilane was added in this preparation example, which is different Preparation Example 8.

Preparation Example 12: 1.2 g of a carboxylated cellulose nanofiber was dissolved to prepare a solution with a concentration of 1 wt %, 1.2 g of chitosan was added and dispersed ultrasonically at a power of 200 W for 20 min, and the mixture was then freeze-dried at −60° C. for 24 h and pulverized to obtain an airgel powder.

2.2 g of polyvinyl alcohol 1788 was dissolved in distilled water to prepare an aqueous solution of polyvinyl alcohol with a concentration of 7 wt %, the airgel powder prepared and 1.5 g of octadecyltrichlorosilane were added, and the resulting solution was mixed adequately to obtain a high-barrier PVA coating solution.

Preparation Examples 13-16 of Water-Barrier Adhesive

In Preparation Example 13, EVA resin used was US DuPont EVA 40W, with a melt index of 52 g/10 min (190° C., 2.16 kg), a density of 0.965 g/cm$^3$ and VA content of 40%, purchased from Kuraray Co., Ltd. (Japan); polydimethylsiloxane (model: PMA-200 500CS) used was purchased from Guangzhou Shengrui Chemical Technology Co., Ltd.; the PDMS curing agent used was Dow Corning DC184; and hydrophobic nanosilica (model: SS-S10B) used was purchased from Hangzhou Jikang New Materials Co., Ltd.

Preparation Example 13: 2 g of polydimethylsiloxane, 20 g of n-hexane and 0.2 g of the PDMS curing agent were mixed together, 1 g of hydrophobic nano-silica was then added, and the mixture was mixed adequately and then dried at 90° C. for 1 h and ultrafinely pulverized to obtain an 2 μm intermediate; and the intermediate was then mixed with 8 g of EVA resin adequately to obtain a water-barrier adhesive. The particle size of the silica used was 30 nm.

Preparation Example 14: 1 g of polydimethylsiloxane, 10 g of n-hexane and 0.1 g of the PDMS curing agent were mixed together, 0.5 g of hydrophobic nano-silica was then added, and the mixture was mixed adequately and then dried at 80° C. for 2 h and ultrafinely pulverized to obtain an 2 μm intermediate; and the intermediate was then mixed with 4 g of EVA resin adequately to obtain a water-barrier adhesive. The particle size of the silica used was 30 nm.

Preparation Example 15: No hydrophobic nano-silica was added in this preparation example, which is different Preparation Example 13.

Preparation Example 16: No polydimethylsiloxane was added in this preparation example, which is different Preparation Example 13.

Examples

In Example 1, HDPE (product number: HHM5502LW) used was purchased from Sinopec Maoming Petrochemical Company; MDPE (brand: HF513) used was purchased from Total; LLDPE (brand: DFDA-7042) used was purchased from Sinopec Maoming Petrochemical Company; LDPE (model: 2426K) used was purchased from Sinopec Maoming Petrochemical Company; polyurethane adhesive (model: XH-66F) used was purchased from Guangdong Xinhui Chemical Co., Ltd.; EVA resin used was US DuPont EVA 40W, with a melt index of 52 g/10 min (190° C., 2.16 kg), a density of 0.965 g/cm$^3$ and VA content of 40%, purchased from Kuraray Co., Ltd. (Japan).

Example 1: This example provided a high-barrier polyolefin composite film, including, from the outside to the inside, an outer PE film, a water-barrier layer, a high-barrier PVA coating layer, an adhesive layer, and a modified inner PE film. The outer PE film having a thickness of 0.02 mm was purchased from Cangzhou Yongsheng Plastic Industry Co., Ltd., with a product number of XH001. The thickness of the modified inner PE film was 0.02 mm. The use amounts of raw materials of the modified inner PE film are shown in Table 1, where the water- and oxygen-barrier masterbatch was prepared according to Preparation Example 1, and the auxiliary agent was antioxidant 1010.

A preparation method of the high-barrier polyolefin composite film described above included the following steps:

In S1, corona treatment was performed on an inner side of the outer PE film, where the power of the corona treatment was 3 KW; the water-barrier adhesive was heated to 50° C. to be hot-melted, and the hot-melted water-barrier adhesive was then applied onto the corona-treated side of the outer PE film and dried to form the water-barrier layer on the outer PE film, where the water-barrier adhesive was EVA resin, and the application amount of the water-barrier adhesive was 3 g/m$^2$.

In S2, the high-barrier PVA coating solution was applied onto the surface of the water-barrier layer and then dried to form a high-barrier PVA coating layer on the water-barrier layer. The high-barrier PVA coating solution was prepared as follows: dissolving 2.2 g of polyvinyl alcohol 1788 in distilled water to prepare an aqueous solution of polyvinyl alcohol with a concentration of 7 wt %. The application amount of the high-barrier PVA coating solution was 6 g/m$^2$.

In S3, the raw materials of the modified inner PE film were mixed according to their use amounts shown in Table 1 and melted, extruded, and blow-molded to obtain the PE inner film, where the extrusion temperature was 160° C., the blowup ratio was 3, and the traction ratio was 4.

In S4, a layer of the adhesive was applied onto the high-barrier PVA coating layer by using a brush roller with a temperature of 50° C., the modified inner PE film was combined on the adhesive by using a hot-press roller with a temperature of 50° C., and the combined film was cooled, drawn, wound up, and aged to obtain the high-barrier polyolefin composite film, where the pressure of the hot-press roller was 0.3 MPa, the pressing time is 0.5 mm/min, the adhesive was a polyurethane adhesive, the application amount of the adhesive was 4 g/m², and the combined film was aged at 35° C. for 12 h.

TABLE 1

Use amounts of raw materials of the modified inner PE film in high-barrier polyolefin composite films in Example 1-4

| Raw material/kg | Example 1 | Example 2 | Example 3 | Example 4 |
| --- | --- | --- | --- | --- |
| HDPE | 12 | 16 | 11 | 20 |
| MDPE | 35 | 30 | 50 | 30 |
| LLDPE | 24 | 20 | 20 | 26 |
| LDPE | 15 | 20 | 10 | 12 |
| Water- and oxygen-barrier masterbatch | 12 | 11 | 8 | 10 |
| Auxiliary agent | 2 | 3 | 1 | 2 |

Example 2: This example provided a high-barrier polyolefin composite film, including, from the outside to the inside, an outer PE film, a water-barrier layer, a high-barrier PVA coating layer, an adhesive layer, and a modified inner PE film. The outer PE film (product number: XH001) having a thickness of 0.015 mm was purchased from Cangzhou Yongsheng Plastic Industry Co., Ltd. The thickness of the modified inner PE film was 0.01 mm. The use amounts of raw materials of the modified inner PE film are shown in Table 1, where the water- and oxygen-barrier masterbatch was prepared according to Preparation Example 2.

A preparation method of the high-barrier polyolefin composite film described above included the following steps:

In S1, corona treatment was performed on an inner side of the outer PE film, where the power of the corona treatment was 5 KW; the water-barrier adhesive was heated to 55° C. to be hot-melted, and the hot-melted water-barrier adhesive was then applied onto the corona-treated side of the outer PE film and dried to form the water-barrier layer on the outer PE film, where the water-barrier adhesive was EVA resin, and the application amount of the water-barrier adhesive was 1 g/m².

In S2, the high-barrier PVA coating solution was applied onto the surface of the water-barrier layer and then dried to form a high-barrier PVA coating layer on the water-barrier layer. The high-barrier PVA coating solution was prepared as follows: dissolving 2.2 g of polyvinyl alcohol 1788 in distilled water to prepare an aqueous solution of polyvinyl alcohol with a concentration of 7 wt %. The application amount of the high-barrier PVA coating solution was 2 g/m².

In S3, the raw materials of the modified inner PE film were mixed according to their use amounts shown in Table 1 and melted, extruded, and blow-molded to obtain the modified inner PE film, where the extrusion temperature was 160° C., the blowup ratio was 3, and the traction ratio was 4.

In S4, a layer of the adhesive was applied onto the high-barrier PVA coating layer by using a brush roller with a temperature of 50° C., the modified inner PE film was combined on the adhesive by using a hot-press roller with a temperature of 50° C., and the combined film was cooled, drawn, wound up, and aged to obtain the high-barrier polyolefin composite film, where the pressure of the hot-press roller was 0.3 MPa, the pressing time is 0.5 mm/min, the adhesive was a polyurethane adhesive, the application amount of the adhesive was 1.2 g/m², and the combined film was aged at 35° C. for 12 h.

Examples 3-4: Examples 3-4 provided a high-barrier polyolefin composite film. Examples 3-4 differ from Example 1 in the use amounts of the raw materials of the modified inner PE film, as shown in Table 1.

Example 5: This example provided a high-barrier polyolefin composite film. This example differs from Example 1 in that the water- and oxygen-barrier masterbatch in the modified inner PE film was prepared according to Preparation Example 3.

Example 6: This example provided a high-barrier polyolefin composite film. This example differs from Example 1 in that the water- and oxygen-barrier masterbatch in the modified inner PE film was prepared according to Preparation Example 4.

Example 7: This example provided a high-barrier polyolefin composite film. This example differs from Example 1 in that the high-barrier PVA coating solution was prepared according to Preparation Example 8.

Example 8: This example provided a high-barrier polyolefin composite film. This example differs from Example 1 in that the high-barrier PVA coating solution was prepared according to Preparation Example 9.

Example 9: This example provided a high-barrier polyolefin composite film. This example differs from Example 1 in that the high-barrier PVA coating solution was prepared according to Preparation Example 10.

Example 10: This example provided a high-barrier polyolefin composite film. This example differs from Example 1 in that the high-barrier PVA coating solution was prepared according to Preparation Example 11.

Example 11: This example provided a high-barrier polyolefin composite film. This example differs from Example 1 in that the high-barrier PVA coating solution was prepared according to Preparation Example 12.

Example 12: This example provided a high-barrier polyolefin composite film. This example differs from Example 7 in that the water-barrier adhesive was prepared according to Preparation Example 13.

Example 13: This example provided a high-barrier polyolefin composite film. This example differs from Example 7 in that the water-barrier adhesive was prepared according to Preparation Example 14.

Example 14: This example provided a high-barrier polyolefin composite film. This example differs from Example 12 in that the water-barrier adhesive was prepared according to Preparation Example 15.

Example 15: This example provided a high-barrier polyolefin composite film. This example differs from Example 12 in that the water-barrier adhesive was prepared according to Preparation Example 16.

Example 16: This example provided a high-barrier polyolefin composite film, including, from the outside to the inside, an outer PP film, a water-barrier layer, a high-barrier PVA coating layer, an adhesive layer, and an inner PP film. The outer PP film and the inner PP film were 0.02 mm in thickness and were purchased from Wenzhou Ruowang Packaging Materials Co., Ltd., with a product number of D05.

A preparation method of the high-barrier polyolefin composite film described above included the following steps:

In S1, corona treatment was performed on an inner side of the outer PP film, where the power of the corona treatment was 3 KW; the water-barrier adhesive was heated to 50° C. to be hot-melted, and the hot-melted water-barrier adhesive was then applied onto the corona-treated side of the outer PP film and dried to form the water-barrier layer on the outer PP film, where the water-barrier adhesive was prepared according to Preparation Example 13, and the application amount of the water-barrier adhesive was 3 g/m².

In S2, the high-barrier PVA coating solution was applied onto the surface of the water-barrier layer and then dried to form a high-barrier PVA coating layer on the water-barrier layer. The high-barrier PVA coating solution was prepared according to Preparation Example 8, and the application amount of the high-barrier PVA coating solution was 6 g/m².

In S3, a layer of the adhesive was applied onto the high-barrier PVA coating layer by using a brush roller with a temperature of 50° C., the inner PP film was combined on the adhesive by using a hot-press roller with a temperature of 50° C., and the combined film was cooled, drawn, wound up, and aged to obtain the high-barrier polyolefin composite film, where the pressure of the hot-press roller was 0.3 MPa, the pressing time is 0.5 mm/min, the adhesive was a polyurethane adhesive (Model: XH-66F), purchased from Guangdong Xinhui Chemical Co., Ltd., the application amount of the adhesive was 4 g/m², and the combined film was aged at 35° C. for 12 h.

Comparative Examples

Comparative Example 1: This comparative example provided a high-barrier polyolefin composite film. This comparative example differs from Example 1 in that the water- and oxygen-barrier masterbatch was prepared according to Preparation Example 5.

Comparative Example 2: This comparative example provided a high-barrier polyolefin composite film. This comparative example differs from Example 1 in that the water- and oxygen-barrier masterbatch was prepared according to Preparation Example 6.

Comparative Example 3: This comparative example provided a high-barrier polyolefin composite film. This comparative example differs from Example 1 in that the water- and oxygen-barrier masterbatch was prepared according to Preparation Example 7.

Comparative Example 4: This comparative example provided a high-barrier polyolefin composite film. This comparative example differs from Example 1 in that no water- and oxygen-barrier masterbatch was added.

Comparative Example 5: This comparative example provided a high-barrier polyolefin composite film. This comparative example differs from Example 1 in that no high-barrier PVA coating solution was provided.

Comparative Example 6: This comparative example provided a high-barrier polyolefin composite film. This comparative example differs from Example 1 in that no water-barrier layer was provided.

Comparative Example 7: This comparative example provided a high-barrier polyolefin composite film. This comparative example differs from Example 1 in that the PE inner film was purchased from Cangzhou Yongsheng Plastic Industry Co., Ltd., with a product number of XH001, and its thickness was 0.02 mm.

Comparative Example 8: This comparative example provided an antibacterial high-oxygen-barrier PE composite film, including a PE film and a PVA film. The PE film included the following raw materials in parts by weight: 100 parts of linear low-density polyethylene, 5 parts of low-density polyethylene, 5 parts of low-density PE-g-MAH, and 12 parts of an antibacterial and antistatic additive. The PVA film included the following raw materials in parts by weight: 100 parts of polyvinyl alcohol resin, 4 parts of silicone oil, 3 parts of propylene glycol, 45 parts of polyethylene glycol, 2 parts of talc, 10 parts of polyethylene wax. The antibacterial high-oxygen-barrier PE composite film was prepared as follows: the raw materials of the outer PE film, the middle PVA film, and the inner PE film were heated and melted by virtue of a twin-screw extruder. For the PE film, the heating temperatures for zones 1-7 were as follows: 160° C., 170° C., 175° C., 180° C., 185° C., 175° C., and 170° C., and the speed of the twin-screw extruder was 30 r/min. For the PVA film, the heating temperatures for zones 1-7 were as follows: 180° C., 190° C., 195° C., 195° C., 210° C., 195° C., and 180° C., and the speed of the twin-screw extruder was 30 r/min. The raw materials were extruded by virtue of a three-layer die, and the melt was cooled on a chill roller to form a cast sheet. The cast sheet was preheated in a 50° C. water bath, and then subjected to a humidity conditioning treatment in a 70° C. water bath. After the humidity conditioning, an air knife was used to blow dry the surface of the cast sheet. Finally, a conventional winding machine is used to wind up the product to obtain the antibacterial and high-oxygen-barrier PE composite film.

Property Test

The composite films were prepared according to the methods in the Examples and Comparative Examples, and their properties were tested with reference to the following methods. The test results were recorded in Table 2.

1. Tensile strength: The test was performed in accordance with GB/T13022-1991 "Plastics-Determination of Tensile Properties of Films", where the loading speed was 1 mm/min.
2. Water vapor permeability rate: The test was performed in accordance with GB/T21529-2008 "Determination of Water Vapor Permeability Rate for Plastic Film and Sheeting", where the test temperature was 40° C. and the relative humidity was 90%.
3. Oxygen permeability rate: The test was performed in accordance with GB/T19789-2005 "Packaging Material-Test Method for Oxygen Gas Permeability Characteristics of Plastic Film and Sheeting-Coulometric Sensor", where the test temperature was 40° C. and the relative humidity was 90%.
4. Peel strength: The peel strength between the inner film and the outer film was tested in accordance with GB8808-1988 "Test Method for T-type Peel Strength of Flexible Laminated Materials".
5. Transparency: The test was performed in accordance with GB/T2410-2008 "Determination of Luminous Transmittance and Haze of Transparent Plastics".

TABLE 2

Property test results of high-barrier polyolefin composite films vapor

| Index | Tensile strength/ MPa | Water vapor permeability rate g/(m² · 24 h) | Oxygen permeability rate cm³/ (m² · 24 h · 0.1 MPa) | Peel strength (N/15 mm) | Transparency/% |
|---|---|---|---|---|---|
| Example 1 | 31.8 | 0.81 | 0.54 | 10.4 | 75 |
| Example 2 | 30.4 | 0.88 | 0.60 | 10.1 | 76 |
| Example 3 | 31.2 | 0.82 | 0.56 | 10.3 | 78 |

TABLE 2-continued

Property test results of high-barrier polyolefin composite films vapor

| Index | Tensile strength/ MPa | Water vapor permeability rate g/(m² · 24 h) | Oxygen permeability rate cm³/ (m² · 24 h · 0.1 MPa) | Peel strength (N/15 mm) | Transparency/% |
|---|---|---|---|---|---|
| Example 4 | 31.5 | 0.84 | 0.58 | 10.4 | 77 |
| Example 5 | 29.5 | 0.95 | 0.71 | 10.2 | 75 |
| Example 6 | 29.1 | 0.84 | 0.67 | 10.3 | 76 |
| Example 7 | 34.7 | 0.51 | 0.35 | 13.4 | 74 |
| Example 8 | 34.5 | 0.54 | 0.32 | 13.1 | 75 |
| Example 9 | 32.5 | 0.57 | 0.38 | 13.3 | 75 |
| Example 10 | 34.6 | 0.68 | 0.47 | 13.4 | 74 |
| Example 11 | 34.1 | 0.61 | 0.43 | 11.2 | 75 |
| Example 12 | 35.6 | 0.41 | 0.32 | 15.4 | 73 |
| Example 13 | 35.4 | 0.42 | 0.33 | 15.3 | 73 |
| Example 14 | 35.6 | 0.46 | 0.33 | 14.7 | 74 |
| Example 15 | 35.0 | 0.43 | 0.32 | 14.1 | 73 |
| Example 16 | 32.4 | 0.51 | 0.23 | 15.2 | 75 |
| Comparative Example 1 | 27.5 | 0.98 | 0.83 | 10.4 | 75 |
| Comparative Example 2 | 31.2 | 1.05 | 0.92 | 10.3 | 79 |
| Comparative Example 3 | 31.7 | 0.96 | 0.79 | 10.4 | 76 |
| Comparative Example 4 | 25.6 | 2.31 | 1.35 | 10.1 | 79 |
| Comparative Example 5 | 30.1 | 2.24 | 1.17 | 9.2 | 76 |
| Comparative Example 6 | 29.7 | 1.03 | 0.82 | 8.7 | 75 |
| Comparative Example 7 | 31.1 | 2.64 | 1.79 | 10.3 | 79 |
| Comparative Example 8 | 28.4 | 2.28 | 0.98 | 10.2 | 75 |

According to Table 2, the water- and oxygen-barrier masterbatches prepared in Preparation Examples 1 and 2 were used in Examples 1 and 2 respectively, and the high-barrier polyolefin composite films thus prepared have good transparency, good barrier properties against water vapor and oxygen, and also have strong adhesion between the outer PE film and the modified inner PE film.

Examples 3 and 4 differ from Example 1 in the use amounts of raw materials, but the high-barrier polyolefin composite films produced in Examples 3 and 4 still have good barrier properties, transparency and mechanical properties.

The water- and oxygen-barrier masterbatches prepared in Preparation Examples 3 and 4 were used in Examples 5 and 6 respectively. In Preparation Examples 3 and 4, maleic anhydride-grafted LDPE and maleic anhydride-grafted POE were used separately as compatibilizers. Compared with Example 1, Examples 5 and 6 produced the high-barrier polyolefin composite films with reduced tensile strength, weakened barrier properties and decreased adhesion between the outer PE film and the modified inner PE film, and this indicates that the combination of maleic anhydride-grafted LDPE and maleic anhydride-grafted EVA can effectively improve the compatibility of the water- and oxygen-barrier masterbatch with the raw materials of the modified inner PE film, and enhance the mechanical properties and barrier properties of the modified inner PE film.

Compared with Example 1, Examples 7 and 8 used the high-barrier PVA coating solutions prepared in Preparation Examples 8 and 9 respectively, and according to Table 2, the tensile strength of the high-barrier polyolefin composite films thus prepared is increased, their barrier properties are further improved, and their adhesion between the outer PE film and the modified inner PE film is increased.

Example 9 used the high-barrier coating solution prepared in Preparation Example 10 in which no chitosan was added to the high-barrier PVA coating solution, as compared with Preparation Example 8. Example 10 used the high-barrier PVA coating solution prepared in Preparation Example 11, in which no octadecyltrichlorosilane was added. According to Table 2, compared with the high-barrier polyolefin composite film prepared in Example 8, the high-barrier polyolefin composite films prepared in Examples 9 and 11 have no obvious changes in peel strength, but Example 9 shows a decrease in tensile strength and Example 10 shows weakened barrier ability.

Example 11 used the high-barrier PVA coating solution prepared in Preparation Example 12, in which tannic acid was not used to treat the airgel powder, as compared with Preparation Example 8, and the high-barrier polyolefin composite film thus prepared shows a decrease in adhesion between the outer PE film and the outer PE film and its barrier properties are slightly weakened.

Compared with Example 7, Examples 12 and 13 used the water-barrier adhesive prepared in Preparation Examples 13 and 14 respectively. According to Table 2, the high-barrier polyolefin composite films prepared in Examples 12 and 13 have further reduced barrier ability against water vapor and increased peel strength, indicating that the water-barrier adhesive can further improve the barrier properties and adhesion of the PE composite film.

Examples 14 and 15 used the water-barrier adhesive prepared in Preparation Examples 15 and 16 respectively. Compared with Example 12, Example 14 produced the PE composite film with reduced barrier ability against water, weakened mechanical properties and decreased adhesion between the outer PE film and the modified inner PE film, and Example 15 produced the PE composite film with weakened water barrier effect.

In Example 16, the outer PP film and the inner PP film were used as base materials, the water-barrier layer, the high-barrier PVA coating layer and the adhesive layer were provided between the outer PP film and the inner PP film, the water-barrier adhesive was prepared according to Preparation Example 13, and the high-barrier PVA coating solution was prepared according to Preparation Example 8. The polyolefin composite film thus prepared has a water vapor barrier property of 0.51 g/(m$^2$·24 h) and an oxygen barrier property of 0.23 cm$^3$/(m$^2$·24 h·0.1 MPa), showing a good barrier ability.

Comparative Example 1 used the water- and oxygen-barrier masterbatch prepared in Preparation Example 5 in which no EVA was added. Compared with Example 1, Comparative Example 1 produced the PE composite film with weakened tensile strength and reduced barrier ability against water and oxygen.

Comparative Example 2 used the water- and oxygen-barrier masterbatch prepared in Preparation Example 6 in which no single-layer graphene was added. Compared with Example 1, Comparative Example 2 produced the PE composite film with weakened barrier ability against oxygen and water.

Comparative Example 3 used the water- and oxygen-barrier masterbatch prepared in Preparation Example 7, in which no polyhedral oligomeric silsesquioxane was added. Compared with Example 1, Comparative Example 3 produced the PE composite film with weakened barrier properties and the PE composite film does not show obvious changes in other properties.

In Comparative Example 4, no oxygen- and water-barrier masterbatch was added. Compared with Example 1, Comparative Example 4 shows an obvious decrease in barrier ability against water vapor and oxygen and weakened tensile strength.

Compared with Example 1, Comparative Example 5 does not provide a high-barrier PVA coating layer, and Comparative Example 6 does not provide a water-barrier layer. The test results in Table 2 show that the PEF composite films prepared in Comparative Examples 5 and 6 have reduced barrier ability and decreased adhesion between the outer PE film and the inner PE film.

In Comparative Example 7, a commercially available PE film was used as the inner film. The barrier properties of the PE composite film prepared in Comparative Example 7 against water vapor and oxygen are significantly reduced.

Comparative Example 8 produced a PE composite film prepared in the prior art. The PE composite film has high oxygen permeability and poor barrier ability against water vapor, indicating that its barrier properties need to be improved.

The specific examples are merely an explanation of the present application and not intended to limit the present application. Those skilled in the art can make modifications, without creative contribution, to the examples as needed after reading this description. Any of the modifications made within the scope of the claims of the present application shall be protected by the Patent Law.

What is claimed is:

1. A polyolefin composite film, comprising, from outside to inside, an outer film, a water-barrier layer, a polyvinyl alcohol coating layer, an adhesive layer, and an inner film, wherein the outer film is an outer polyethylene film, and the inner film is a modified inner polyethylene film;
the modified inner polyethylene film comprises the following raw materials in percentage by weight: 10-20% of high-density polyethylene, 30-50% of medium-density polyethylene, 20-26% of linear low-density polyethylene, 10-20% of low-density polyethylene, 8-12% of a water- and oxygen-barrier masterbatch, and 1-3% of an auxiliary agent; and
the water- and oxygen-barrier masterbatch comprises the following raw materials in parts by weight: 10-20 parts of polycarbonate, 0.1-0.3 parts of a compatibilizer, 10-20 parts of an ethylene-vinyl acetate copolymer, 1-2 parts of single-layer graphene, and 1-2 parts of polyhedral oligomeric silsesquioxane.

2. The polyolefin composite film according to claim 1, wherein the water- and oxygen-barrier masterbatch is prepared as follows:
hot-melting the ethylene-vinyl acetate copolymer, adding the polyhedral oligomeric silsesquioxane and the single-layer graphene purified with concentrated nitric acid to melted ethylene-vinyl acetate copolymer, dispersing the melted ethylene-vinyl acetate copolymer ultrasonically for 1-2 h, and drying the melted ethylene-vinyl acetate copolymer to constant weight at 50-60° C. to obtain modified single-layer graphene; and
mixing the modified single-layer graphene with the polycarbonate and the compatibilizer and performing melting, extruding and granulating, and drying.

3. The polyolefin composite film according to claim 1, wherein the compatibilizer comprises maleic anhydride-grafted low-density polyethylene and maleic anhydride-grafted ethylene-vinyl acetate at a mass ratio of 1:0.3-0.5.

4. The polyolefin composite film according to claim 1, wherein the polyvinyl alcohol coating layer is formed from a polyvinyl alcohol coating solution, and preparation of the polyvinyl alcohol coating solution comprises the following steps:
dissolving a carboxylated cellulose nanofiber to prepare a solution with a concentration of 0.8-1 wt % of the carboxylated cellulose nanofiber, adding chitosan to the solution, performing ultrasonic dispersion, freeze-drying and pulverizing to obtain an airgel powder;
dissolving tannic acid to prepare a tannic acid solution with a concentration of 2-4 wt % of the tannic acid, immersing the airgel powder in the tannic acid solution for 5-10 min, and washing to obtain a modified airgel powder; and
dissolving polyvinyl alcohol to prepare an aqueous solution of polyvinyl alcohol with a concentration of 5-7 wt % of the polyvinyl alcohol, adding the modified airgel powder and octadecyltrichlorosilane to the aqueous solution, and mixing evenly to obtain the polyvinyl alcohol coating solution.

5. The polyolefin composite film according to claim 4, wherein the polyvinyl alcohol coating solution comprises the following raw materials in parts by weight: 1.5-2.2 parts of the polyvinyl alcohol, 1-1.2 parts of the carboxylated cellulose nanofiber, 0.8-1.2 parts of the chitosan, 0.4-0.6 parts of the tannic acid, and 1-1.5 parts of the octadecyltrichlorosilane.

6. The polyolefin composite film according to claim 1, wherein the water-barrier layer is formed by hot-melting and curing a water-barrier adhesive and the water-barrier adhesive is prepared as follows:
by weight, mixing 1-2 parts of polydimethylsiloxane, 10-20 parts of n-hexane and 0.1-0.2 parts of a polydimethylsiloxane curing agent evenly to obtain a mixture, adding 0.5-1 part of hydrophobic nano-silica to the mixture, mixing the mixture evenly, drying the mixture at 80-90° C. for 1-2 h, and ultrafinely pulverizing the mixture to obtain an intermediate; and mixing the intermediate with 4-8 parts of ethylene-vinyl acetate resin evenly to obtain the water-barrier adhesive.

7. The polyolefin composite film according to claim 1, wherein the adhesive layer is formed by curing an adhesive, and the adhesive is one selected from a group consisting of a polyurethane adhesive, an epoxy resin adhesive, and an acrylic resin adhesive.

8. The polyolefin composite film according to claim 1, wherein a thickness ratio of the outer polyethylene film to the modified inner polyethylene film is 1-1.5:1.

9. A preparation method of the polyolefin composite film according to claim 1, comprising the following steps:

performing corona treatment on an inner side of the outer film to obtain a corona-treated side of the outer film, heating a water-barrier adhesive to 50-55° C. to obtain a heated water-barrier adhesive, applying the heated water-barrier adhesive onto the corona-treated side of the outer film, and drying the heated water-barrier adhesive to form the water-barrier layer on the outer film;

applying a polyvinyl alcohol coating solution onto a surface of the water-barrier layer and drying the polyvinyl alcohol coating solution to form the polyvinyl alcohol coating layer on the water-barrier layer; and applying a layer of adhesive onto the polyvinyl alcohol coating layer by using a brush roller at a temperature of 35-50° C., and combining the inner film on the adhesive by using a hot-press roller at a temperature of 35-50° C. to obtain a combined film; and performing cooling, drawing, winding up, and aging on the combined film to obtain the polyolefin composite film.

10. The preparation method of the polyolefin composite film according to claim 9, wherein an application amount of the water-barrier adhesive is 1-3 g/m$^2$, an application amount of the polyvinyl alcohol coating solution is 2-6 g/m$^2$, and an application amount of the adhesive is 1.2-4 g/m$^2$.

* * * * *